United States Patent [19]

Stuart

[11] 3,731,785
[45] May 8, 1973

[54] METHOD AND APPARATUS FOR FORMING TYNE LAYERS IN AUTOMATIC BRICK STACKING SYSTEMS

[75] Inventor: Gerald L. Stuart, Siler City, N.C.

[73] Assignee: Forrest Paschal Machinery Company, Siler City, N.C.

[22] Filed: May 1, 1972

[21] Appl. No.: 249,031

[52] U.S. Cl. ................................ 198/35, 214/1 BB
[51] Int. Cl. ...................... B65g 57/02, B65g 59/02
[58] Field of Search ................... 198/35; 294/87; 214/1 BB, 6 A, 6 M, 8.5 C

[56] References Cited

UNITED STATES PATENTS 3,039,593   6/1962   Edmonds .......................... 198/35

*Primary Examiner*—Edward A. Sroka
*Attorney*—Charles R. Rhodes et al.

[57] ABSTRACT

Double-layer courses of bricks, with the bricks in one layer atop the bricks in the other layer, are marshalled along an index conveyor between a kiln car unstacking apparatus and a brick stacking and strapping apparatus. A pickup head is lowered to a position overlying selected courses and a first set of gripper members is activated to grip the entire upper layer while a second set of grippers, independently operated from the first set, is activated to grip selected bricks in the lower layer, the selected brick being those necessary to form the tyne openings. The pickup head is then moved vertically and horizontally to a second position where selected brick from the lower layer are deposited on a tyne brick table. The pickup head is then moved to a third position where the upper level of brick is returned to its initial position atop the lower level in the same selected course. During the pickup and depositing of the upper layer and selected bricks from the lower layer, a separator sheet or board is placed atop the lower layer either automatically or manually.

7 Claims, 3 Drawing Figures

METHOD AND APPARATUS FOR FORMING TYNE LAYERS IN AUTOMATIC BRICK STACKING SYSTEMS

BACKGROUND OF THE INVENTION

In the automatic handling and stacking of brick, after the brick leave the curing kiln, the kiln cars carry the bricks in open stacks to an unstacking area where they are unstacked and placed on some type of conveyor which carries the brick to the stacking and strapping section. The brick may be placed on this conveyor either in single file, or in complete courses of multiple rows across the width of the conveyor. Moreover, it has been recognized that by using double-layer courses or rows, economies may be realized since twice as many brick may be handled during the same time interval.

Double-layer courses or rows, while being economically desirable, present some difficulties, especially in the forming of the tyne layer for the brick stacks.

The tyne layer is the layer that includes a pair of openings where several bricks are removed to allow an opening for the tynes of a material handling fork truck to be received so that the entire stack of brick may be moved about after it is completed and strapped. The tyne course or layer is conventionally the third layer from the bottom of the completed brick stack or package, and therefore, when double-layer courses are stacked, the tyne layer will appear on the lower layer of the double-layer courses as they proceed along the conveyor. Some automatic equipment has been developed to automatically form these tyne courses such as is illustrated in U.S. Pat. Nos. 3,491,901 and 3,392,851. Both of the apparatuses shown in these patents, however, are useful only in operating on single layer rows or courses and therefore are not adapted for use with double-layer courses.

The present invention, however, is directed to a method and apparatus for use with double-layer courses, and in this respect as a course comprising two layers of brick proceeds along an index conveyor and reaches a first position, the pickup head, according to the present invention, is lowered to the gripping position. All of the bricks in the upper layer of the course are gripped on their ends or headers by a first set of grippers, at the same time a second set of grippers engage and apply pressure to the ends or headers of selected bricks in the lower layer which are to be removed to form the tyne openings. The pickup head is then elevated and moved horizontally to a release position above a tyne brick table, where the second set of grippers are released to deposit the brick picked up from the lower layer thereonto. The pickup head then moves to a position overlying the same course from which the bricks were removed and redeposits the upper layer of bricks on the lower layer after a separator board has been placed atop the remaining bricks of the lower layer.

The bricks on the tyne brick table are removed by tilting the table or by any other means and deposited in a bin or other receptacle adjacent a make-up plate where an operator manually forms double-layer courses which are subsequently pushed back onto an open space on the conveyor.

The first set of grippers are operated independently from the second set so that, if desired, the apparatus may be used merely to remove the upper layer of brick without disturbing the lower layer. Further, the apparatus may be used to form the tyne openings or voids in the lower layer of a double-layer course whether the course includes one row of brick or any number of rows, the maximum number being limited only by the ability of a set of grippers to adequately grip between headers without breaking the brick. The maximum number of rows for such an operation is generally considered to be six.

Moreover, although the specification is directed to brick handling, it is readily apparent that it is applicable to any type of article which is of a known size and shape and which may be processed in double-layer courses on its way to a stacking apparatus.

It is therefore an object of the present invention to provide a novel and improved brick handling apparatus adapted to form tyne openings in the lower layer of a double-layer course passing along a conveyor.

It is another object of the present invention to provide an apparatus of the type described which removes from the double-layer course the upper layer and selected bricks from the lower layer which are removed to form the tyne openings, deposits the selected bricks from the lower layer on a tyne brick table, and then replaces the upper layer atop the lower layer of the same course from which it was removed at a subsequent point on the conveyor.

A further object of the invention is to provide an improved and more efficient method of forming tyne openings in the proper layer of bricks in an automated brick stacking system.

Further objects and advantages of the invention will be more apparent upon reading the following specification in view of the drawings, wherein.

Figure 1:
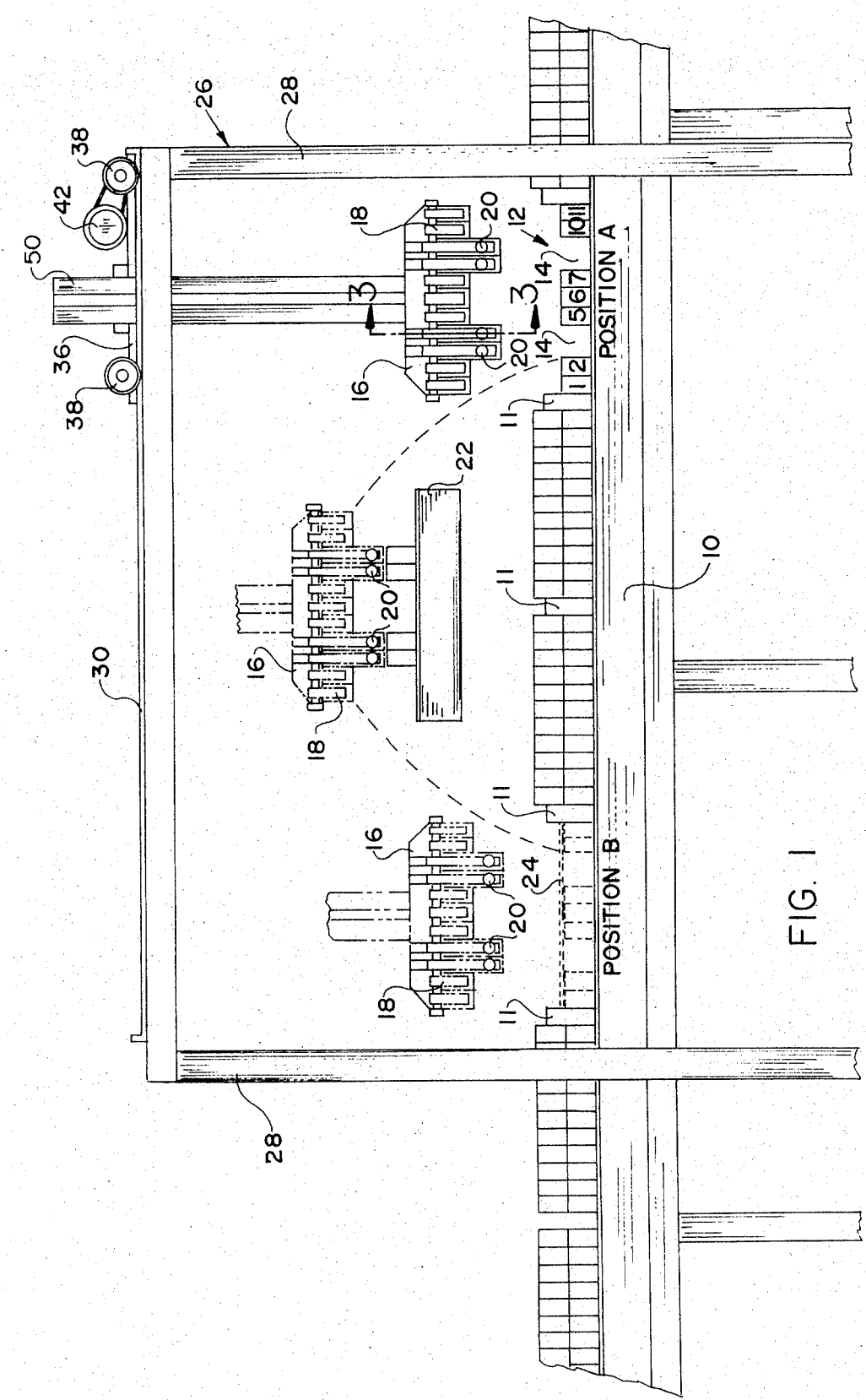
FIG. 1 is a side elevation of the apparatus according to the present invention.
Figure 2:
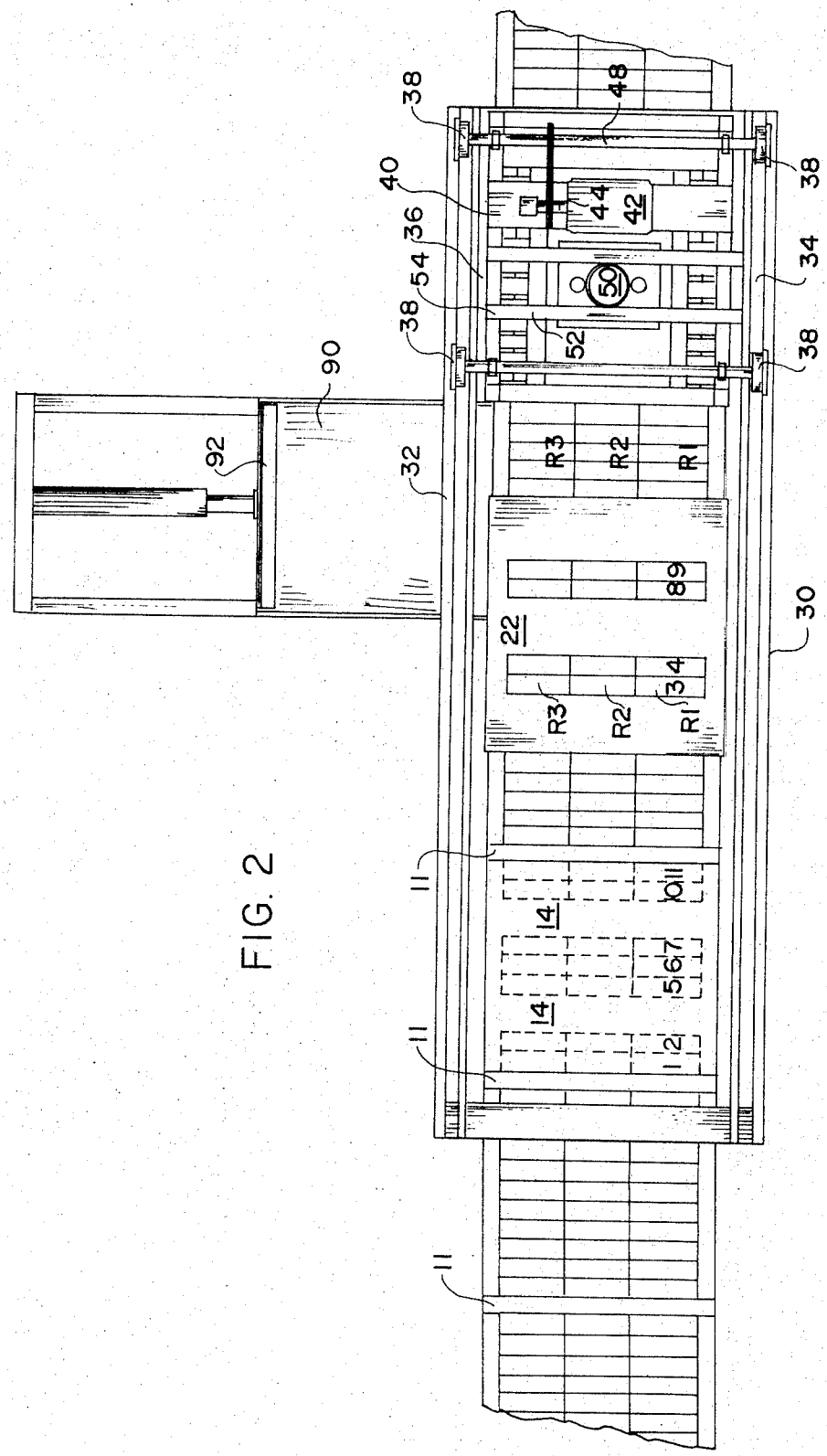
FIG. 2 is a plan view of the apparatus illustrated in FIG. 1.

Referring to FIGS. 1 and 2, courses 12 of brick proceed along a power driven index conveyor 10 between a kiln car unloading station (not shown) and a brick stacking and strapping station (not shown). The conveyor 10 may be a flat apron type conveyor, however since the brick are stacked in two layers, conveyor 10 preferably includes a plurality of spaced walls 11 which prevent toppling of the stacked brick. The distance between adjacent walls 11 forms a pocket having a longitudinal dimension equal to the length of the rows R in each course. According to conventional stacking procedures in every fifth double-layer course 12, tyne openings 14 must be formed in the lower layer thereof, so that the tyne openings will be present in the third layer of brick from the bottom of each finished stack. Each course 12 includes two layers with each layer having one or more rows with each row. Bricks 3, 4, 8, and 9 are removed from each row of the lower layer to form the tyne openings 14. The number of rows R of bricks across the conveyor may vary from one to six, however in the illustrated embodiment, there are shown three rows of bricks. It is to be recognized, however, this number could vary from a single row up to six rows, six rows being about the maximum that can be lifted from the ends. Also, other brick handling plans may have from 8-10 bricks in each row, however this is not important to the concept of this invention, the only difference being in where the bricks are removed from the lower layer to form tyne openings 14.

As every fifth double-layer course 12 reaches a selected position (position A in FIG. 1), a pickup head 16, according to the present invention, is lowered into gripping position overlying course 12, and a first set 18 of gripper members grip the upper layer of bricks at their ends or headers while a second set 20 of gripper members grip the third, fourth, eighth, and ninth bricks in each row of the lower layer. The grippers in set 18 may grip the end of each brick or there may be one pair of long gripper members which engages the headers of all eleven bricks. The second set of gripper members may be combined similarly. The pickup head 16 is then moved to a position immediately above a tyne brick table 22, whereupon the pickup head is again lowered and the second set 20 of grippers released to deposit the bricks lifted from the lower layer thereonto. The pickup head is then moved to position B.

In the meantime, course 12 has indexed along conveyor 10 to position B (illustrated by the dotted line position in FIG. 1) and has had a separator sheet 24 placed thereon. Pickup head 16 is then lowered and the first set 18 of grippers released to deposit the upper layer of brick onto the separator sheet, whereupon the conveyor 10 moves the course 12 with the lower layer thereof having tyne openings provided therein onto the stacking and strapping apparatus (not shown). The tyne brick table 22 is preferably aligned with and positioned immediately above the conveyor 10, however, it should be noted that tyne brick table 22 might also be at a point laterally spaced from the conveyor, if desired. Also, if some turn in conveyor 10 is desired, position B might occur on a second conveyor angularly displaced with respect to conveyor 10.

The pickup head 16 is mounted for vertical and horizontal movement on a frame 26 comprising a plurality of upright legs 28 and an upper rectangular horizontal frame 30. Opposed side members 32, 34 of frame 30 form a track for carriage 36, which is reciprocally mounted on tracks 32, 34 by means of wheels 38. Carriage 36 includes a cross member 40, upon which a motor 42 is mounted with the output shaft 44 thereof operatively connected to one of the axles 46 connecting a pair of wheels 38. The motor activates the carriage to move it back and forth between positions A and B according to a prescribed program.

A double acting air or hydraulic cylinder 50 is secured to another pair of cross members 52, 54 of carriage 36 and pickup head 16 reciprocates vertically in response to movement of the piston thereof.

Figure 3:
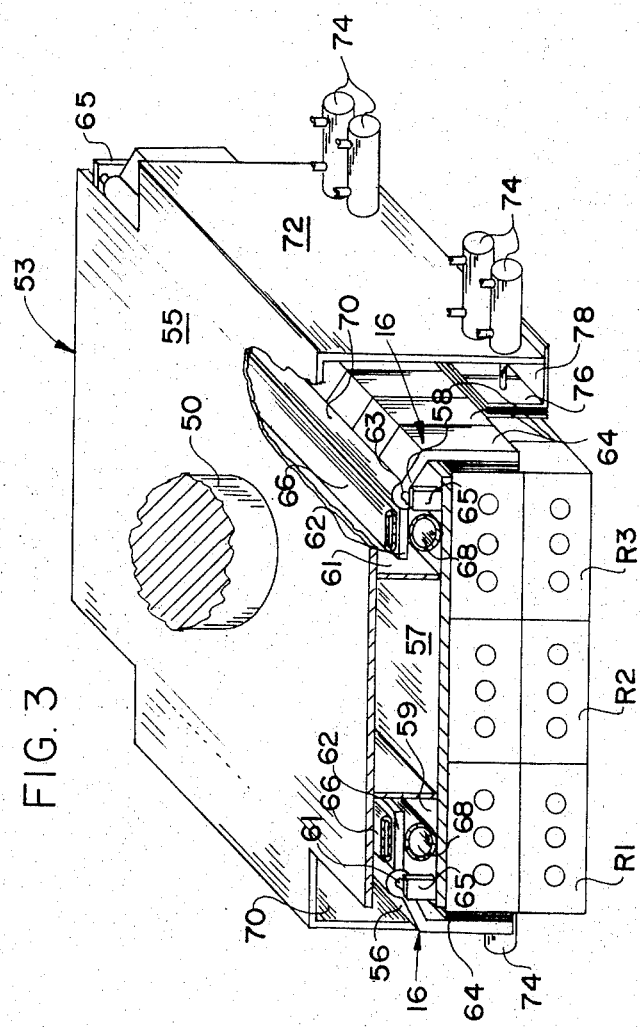
FIG. 3 is a perspective view of the pickup head alone as illustrated in FIGS. 1 and 2.

Referring to FIG. 3, the pickup head 16, itself, comprises a frame 53 including an upper plate 55 attached to the lower end of the piston of cylinder 50 and having a lower plate 57 depending therefrom in spaced relation thereto forming a pair of side channels 59, 63. The first set of grippers 16 comprise a plurality of individual gripper levers 56, 58 with each of levers 56 adapted to engage the end of one of the bricks in one side row $R_3$ of the upper layer of bricks in course 12, while each of levers 58 is adapted to engage the end of one of the bricks in the opposite side row $R_1$ of the upper layer. In a preferred embodiment each of the gripper levers 56, 58 in the first set 16 comprise a hub 60 from which two arcuately spaced arms 62, 64 extend, the angle between arms 62, 64 not being critical. Arm 62 extends horizontally above lower plate 57, while arm 64 depends vertically adjacent the end of one of the bricks in the upper layer. A plurality of such gripper levers 56 are pivotally attached in side-by-side relationship along a rod 61 fastened between upstanding brackets 65 and extending along one side of frame 53, there being one lever 56 for each brick in the outside row $R_1$, of the upper layer. Levers 58 are attached in a similar manner along the other side of frame 53.

Each set of levers 56, 58 is activated by means of a pair of longitudinally extending, inflatable hoses or bags 66, 68, each of which is suitable secured at the ends thereof to frame 53 and extends along each set of the assembled levers 56, 58 on either side of the upper arm 62. As bag 66 is inflated, air is released from bag 68 and the arm 64 of lever 56 is caused to release, and as bag 68 is inflated, bag 66 is deflated and the arm 64 of lever 56 is moved into gripping relationship with the end of the appropriate brick. Such an arrangement for activating levers or grippers is commercially available as a "Windjammer" short stroke, high pressure clamping device sold by Merriman Products, Inc. of Jackson, Michigan, and it, in itself, is not considered to be novel.

The second set of grippers 18 comprises plates 70, 72 which depend from each side of upper plate 55 of pickup head 16, opposite the ends of at least the numbers 3, 4, 8 and 9 bricks in the side rows $R_1$ and $R_3$ of the lower layer of course 12. A double acting air cylinder 74 is attached to the outside of plates 70, 72 opposite each brick in the lower layer to be lifted, and the piston thereof extends through openings in the plate toward the ends of the adjacent bricks in the lower layer. A gripper plate 76 is attached to the free end of the piston of each air cylinder 74 and includes a lower plate member 78 extending back under the terminal end of corresponding arm 70, 72 to prevent skewing of the gripper member during operation.

In operation, gripper members 56 and 58 may be operated independently of gripper plates 76, 78 so that the upper layer of bricks may be lifted from the course 12 with or without simultaneous lifting of the bricks from the lower layer to form tyne openings 14. Additionally, as the pickup head is moved above the tyne brick table 22, air cylinders 74 only are deactivated to deposit bricks 3, 4, 8, 9 from each row of the lower layer onto the tyne brick table, while the bricks in the upper layer are retained between grippers 56, 58 and are deposited later onto the separator board 24 at position B.

The bricks deposited on tyne table 22 are slid off into a bin or container adjacent a makeup table 90, and an operator builds either another full double-layer course or a course having a tyne layer with these bricks. When a complete course has been built on buildup table 90, the operator signals the head of the conveyor 10 and one tray or space between walls 11, which would normally be occupied by a course, is allowed to pass along the conveyor empty. As it reaches a position opposite makeup table 90, a pusher member 92 is activated to push the course onto the conveyor, so that even the bricks being removed from the tyne layer are eventually put back into the system and do not have to be rerouted back to the head of the conveyor 10.

Although a preferred embodiment of the invention has been shown and illustrated, it should be understood that various modifications might be developed without departing from the scope of the invention, which should be limited only by the following claims.

What is claimed is:

1. Apparatus for automatically forming voids in the lower layer of a double-layer course of articles, each article having a predetermined length and width, proceeding along an index conveyor, said apparatus including:

a frame having frame moving means associated therewith for moving said frame from a position removed from said double-layer course to a gripping position overlying said double-layer course;

a first set of gripper members depending from said frame and engageable with the articles in the upper layer of said course;

a second set of gripper members depending from opposite sides of said frame, extending below said first set and engageable with opposite ends of some selected articles only in the lower layer of said course;

said first and second sets of grippers being operable independently of each other.

2. The apparatus according to claim 1 and further including a tyne brick table, said frame moving means also adapted to move said frame from said gripping position to a first release position above said tyne brick table.

3. The apparatus according to claim 2 wherein said frame moving means further moves said frame from said first release position to a second release position above said conveyor overlying said lower layer.

4. The apparatus according to claim 3 wherein said frame moving means comprises a carriage reciprocally movable above said conveyor along a path parallel to the path of movement thereof between said gripping positions and said first and second release positions, and a cylinder means attached to said carriage with the piston thereof vertically oriented and having said frame attached to the free end thereof.

5. The apparatus according to claim 1 wherein said first set of gripper members depend from opposite sides of said carriage and apply sufficient pressure on the ends of said articles to lift the entire upper layer.

6. The apparatus according to claim 5 wherein said second set of gripper members is separate from said first set and operated by a separate activating means.

7. A method of forming the tyne layer in a stack of articles formed of a plurality of courses of said articles comprising the steps of:

a. forming double-layer courses of articles on a conveyor carrying the articles to a stacking machine;

b. at a first position in predetermined courses, simultaneously lifting the entire upper layer and selected articles in the lower layer, said selected articles in the lower layer being those to be removed to form tyne openings in said lower layer;

c. depositing said selected articles from said lower layer on an auxiliary surface;

d. placing a separator sheet on the remaining bricks in said lower layer; and e. replacing said upper layer on said separator sheet atop said lower layer.

* * * * *

Notice of Adverse Decision in Interference

In Interference No. 98,724, involving Patent No. 3,731,785, G. L. Stuart, METHOD AND APPARATUS FOR FORMING TYNE LAYERS IN AUTOMATIC BRICK STACKING SYSTEMS, final judgment adverse to the patentee was rendered Oct. 25, 1977, as to claims 1, 5, 6 and 7.

[*Official Gazette February 14, 1978.*]